(12) United States Patent
Parampottil

(10) Patent No.: US 10,904,297 B1
(45) Date of Patent: *Jan. 26, 2021

(54) CONTROLLED-ENVIRONMENT FACILITY RESIDENT AND ASSOCIATED NON-RESIDENT TELEPHONE NUMBER INVESTIGATIVE LINKAGE TO E-COMMERCE APPLICATION PROGRAM PURCHASES

(71) Applicant: Securus Technologies, Inc., Carrollton, TX (US)

(72) Inventor: Isaac Parampottil, Coppell, TX (US)

(73) Assignee: Securas Technologies, LLC, Carrollton, TX (US)

( * ) Notice: Subject to any disclaimer, the term of this patent is extended or adjusted under 35 U.S.C. 154(b) by 35 days.

This patent is subject to a terminal disclaimer.

(21) Appl. No.: 16/442,615

(22) Filed: Jun. 17, 2019

(51) Int. Cl.
*G06F 15/173* (2006.01)
*H04L 29/06* (2006.01)
*H04L 12/58* (2006.01)
*G06Q 30/06* (2012.01)

(52) U.S. Cl.
CPC ....... *H04L 63/306* (2013.01); *G06Q 30/0607* (2013.01); *H04L 51/046* (2013.01)

(58) Field of Classification Search
None
See application file for complete search history.

(56) References Cited

U.S. PATENT DOCUMENTS

| 7,106,843 | B1* | 9/2006 | Gainsboro | .......... H04M 3/2281 |
| | | | | 379/191 |
| 7,664,689 | B1* | 2/2010 | Rosenfield | ............. G06Q 20/10 |
| | | | | 705/35 |
| 9,723,040 | B1* | 8/2017 | Lubbehusen | ........... H04L 67/02 |
| 9,800,721 | B2 | 10/2017 | Gainsboro et al. | |
| 2002/0068582 | A1 | 6/2002 | Zawislak | |
| 2008/0040781 | A1 | 2/2008 | Keiser et al. | |
| 2009/0067587 | A1 | 3/2009 | Rokosky et al. | |
| 2012/0262271 | A1 | 10/2012 | Torgersrud et al. | |
| 2013/0031176 | A1 | 1/2013 | Shih et al. | |

(Continued)

*Primary Examiner* — Mohamed Ibrahim
(74) *Attorney, Agent, or Firm* — Fogarty LLP

(57) ABSTRACT

Investigative systems and methods linking controlled-environment facility residents and associated non-resident telephone numbers to e-commerce application program (app) purchases capture (a) non-resident telephone number(s) associated with (an) electronic communication(s) with a controlled-environment facility resident and/or (a) telephone number(s) associated with a non-resident communicating with a controlled-environment facility resident. E-commerce app accounts associated with the captured telephone number(s) are determined, e-commerce app account(s) associated with the captured telephone number(s) is (are) accessed and information about purchases made by a non-resident associated with the accessed e-commerce app account(s), through the accessed app account(s) is gathered. A determination is then made whether information about (a) purchase(s) made through the accessed e-commerce app account(s) correlate with the resident, and an investigative lead resulting from information about the purchase(s) made through the at least one accessed e-commerce app account correlating with the resident is provided.

20 Claims, 3 Drawing Sheets

(56) References Cited

U.S. PATENT DOCUMENTS

| | | |
|---|---|---|
| 2013/0179949 A1* | 7/2013 | Shapiro .................. G06F 21/10 726/4 |
| 2013/0263227 A1* | 10/2013 | Gongaware ............ H04L 63/08 726/4 |
| 2013/0268589 A1 | 10/2013 | Torgersrud et al. |
| 2014/0025372 A1 | 1/2014 | Tamura et al. |
| 2014/0279789 A1 | 9/2014 | Torgersrud |
| 2014/0379805 A1 | 12/2014 | Wang et al. |
| 2015/0215254 A1 | 7/2015 | Bennett |
| 2017/0147662 A1 | 5/2017 | Olligschlaeger et al. |

* cited by examiner

US 10,904,297 B1

CONTROLLED-ENVIRONMENT FACILITY RESIDENT AND ASSOCIATED NON-RESIDENT TELEPHONE NUMBER INVESTIGATIVE LINKAGE TO E-COMMERCE APPLICATION PROGRAM PURCHASES

TECHNICAL FIELD

The present disclosure relates generally to communications with residents of controlled-environment facilities, specifically to linkage of e-commerce purchases associated with non-resident telephone numbers used in such communications with controlled-environment residents, and particularly to systems and methods for controlled-environment facility resident and associated non-resident telephone number investigative linkage to e-commerce application program purchases.

BACKGROUND

According to the International Centre for Prison Studies, the United States has the highest prison population per capita in the world. In 2009, for example, 1 out of every 135 U.S. residents was incarcerated. Generally, inmates convicted of felony offenses serve long sentences in prison (e.g., federal or state prisons), whereas those convicted of misdemeanors receive shorter sentences to be served in jail (e.g., county jail). In either case, while awaiting trial, a suspect or accused may remain incarcerated. During his or her incarceration, an inmate may have opportunities to communicate with the outside world.

By allowing prisoners to have some contact with friends and family while incarcerated, the justice system aims to facilitate their transition back into society upon release. Traditional forms of contact include telephone calls, in-person visitation, conjugal visits, etc. More recently, technological advances have allowed jails and prisons to provide other types of visitation, including individual-to-individual videoconferences, which may be typically referred to as "video visitation," and online chat sessions.

Traditional communication services provided residents of controlled-environment facilities (such as correctional facilities) include allowing residents (inmates) to place outbound phone calls to non-residents of the controlled-environment facility. Additionally, non-residents can typically schedule video visitation with residents (inmates) of the controlled-environment facility. Other types of communication available to controlled-environment residents include the ability to exchange email and canned text messages between residents and non-residents of the controlled-environment facility. Basically, all of these forms of communication aim to facilitate communication between a resident of a controlled-environment facility and a non-resident.

Controlled-environment facilities typically control, and record information related to the various interactions, communications, and/or transactions involving the facilities' residents. For example, in a correctional facility (e.g., a prison or jail), such information may be collected and used for investigative purposes with respect to past, present, and future criminal activities. Accordingly, various exchanges of information, communication, money, goods, etc. may be recorded and stored in one or more electronic databases.

E-commerce (i.e. commercial transactions conducted electronically on the Internet) has emerged as a primary form for making purchases, in general. Traditionally, e-commerce has taken place via retailer websites, or the like. Controlled-environment facility resident access to such websites, if allowed at all, is very limited and heavily controlled and monitored.

Additionally, over the past several years, the above-mentioned sharp increase in the U.S. inmate population has not been followed by a proportional increase in the number of prison or jail staff. To the contrary, budget pressures in local, state, and federal governments have made it difficult for correctional facilities to maintain an adequate number of wardens, officers, and other administration personnel. Hence, many correctional facilities are often unable to perform investigations with respect to their own inmates.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The present invention is directed to systems and methods which provide investigative linkage of controlled-environment facility residents and associated non-resident telephone numbers to e-commerce app purchases. A controlled-environment facility secure communication platform, or the like, captures at least one non-resident telephone number associated with one or more electronic communications with a controlled-environment facility resident and/or at least one telephone number associated with a non-resident communicating with a controlled-environment facility resident. A non-resident telephone number associated with the electronic communication(s) may be a telephone number called by the resident and/or the non-resident telephone number associated with the electronic communication(s) maybe a telephone number the non-resident used to call the resident.

An investigative data aggregation and analysis system, or the like, receives the telephone number(s) and identification of the resident from the controlled-environment facility secure communication platform, or the like, and determines e-commerce application program accounts associated with the captured telephone number(s).

The investigative data aggregation and analysis system, or the like, accesses at least one e-commerce application program account associated with the captured telephone number(s) and gathers information about purchases made, by a non-resident associated with the accessed e-commerce application program account(s), through the accessed e-commerce application program account(s). Therefore, prior to any communications with a controlled-environment facility resident, a waiver to access e-commerce application program account(s) associated with the non-resident and/or a telephone number associated with the non-resident, a waiver, or the like, may be obtained from the non-resident. Gathering information about purchases made through the accessed e-commerce application program account(s) may include monitoring purchases made through the at least one accessed e-commerce application program account.

The investigative data aggregation and analysis system, or the like, then determines whether information about the purchases made through the accessed e-commerce application program account(s) correlate with the resident and provide an investigative lead resulting from information about the purchases made through the accessed e-commerce application program account correlating with the resident. The investigative data aggregation and analysis system, or the like, may provide the investigative lead to users via a web-based interface provided by the investigative data aggregation and analysis system.

Thereafter, subsequent purchases made through at least one accessed e-commerce application program account may be monitored. For example, the investigative data aggregation and analysis system, or the like, may receive information about at least one subsequent electronic communication between the resident and non-resident, from the controlled-environment facility secure communication platform, or the like. The investigative data aggregation and analysis system, or the like, may then determine if further e-commerce application program account(s) are associated with a same or a different non-resident telephone number associated with the subsequent electronic communication(s). The investigative data aggregation and analysis system, or the like, may access e-commerce application program account(s) associated with the same or different non-resident telephone number and gather information about further purchase(s) made, by a non-resident associated with the accessed e-commerce application program account(s), through the accessed e-commerce application program account(s). The investigative data aggregation and analysis system, or the like, may determine whether information about further purchase(s) made through the further accessed e-commerce application program account(s) further correlates with the resident, and supplement the investigative lead with information about the further purchase(s) in response to a determination that the information about the further purchase(s) further correlates with the resident.

In various embodiments, one or more of the techniques described herein may be performed by one or more computer systems. In other various embodiments, a tangible computer-readable storage medium may have program instructions stored thereon that, upon execution by one or more computer systems, cause the one or more computer systems to execute one or more operations disclosed herein. In yet other various embodiments, one or more systems may each include at least one processor and memory coupled to the processor(s), wherein the memory is configured to store program instructions executable by the processor(s) to cause the system(s) to execute one or more operations disclosed herein.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Figure 1:
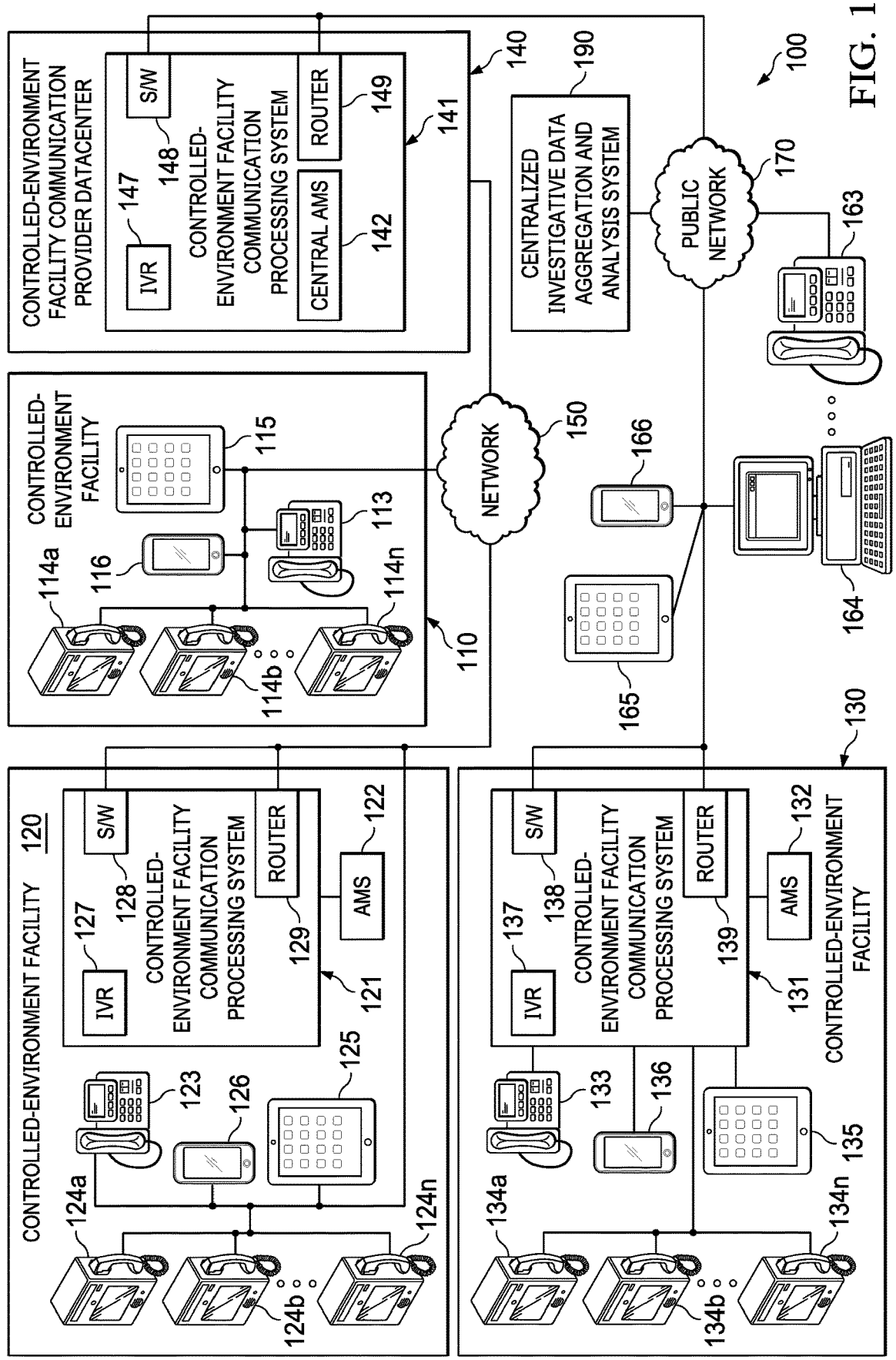
Figure 2:
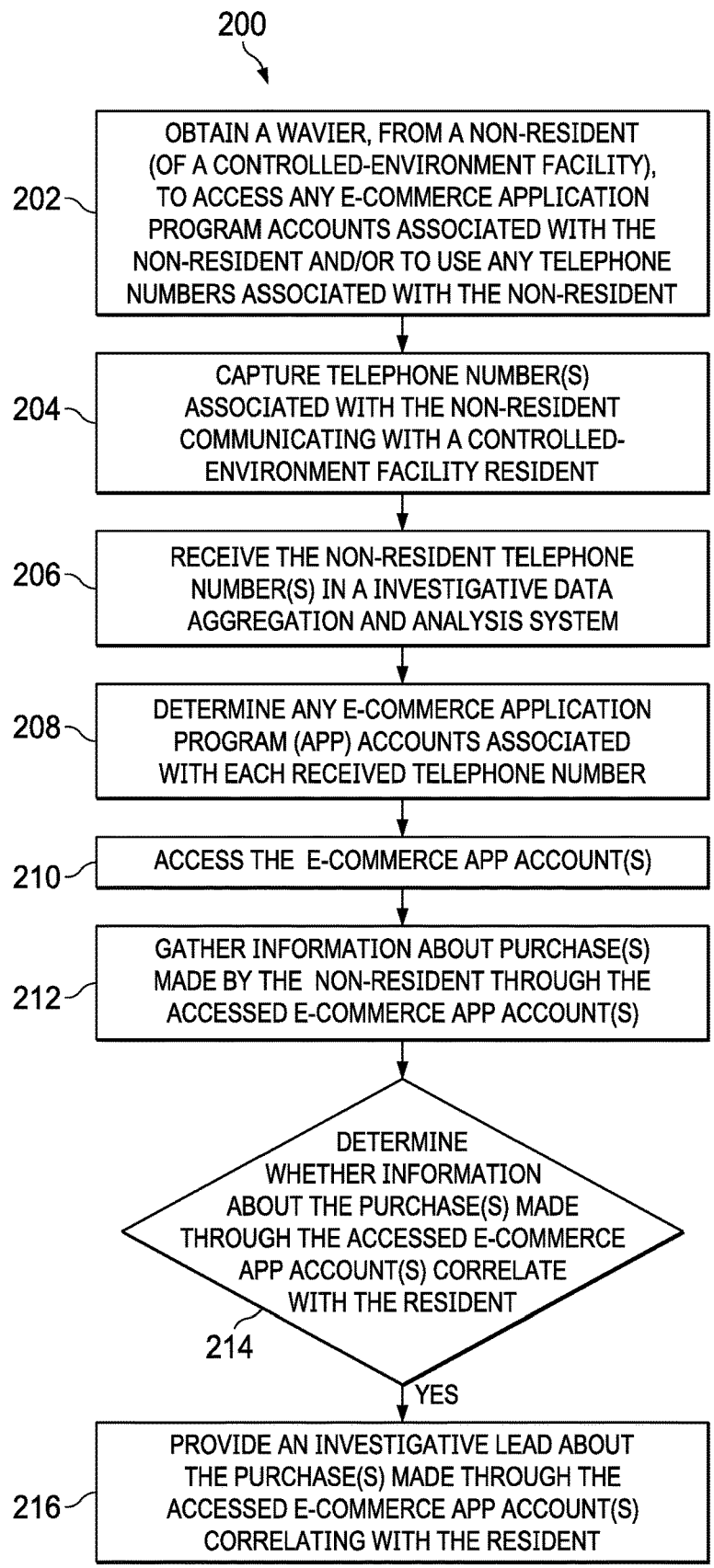
Figure 3:
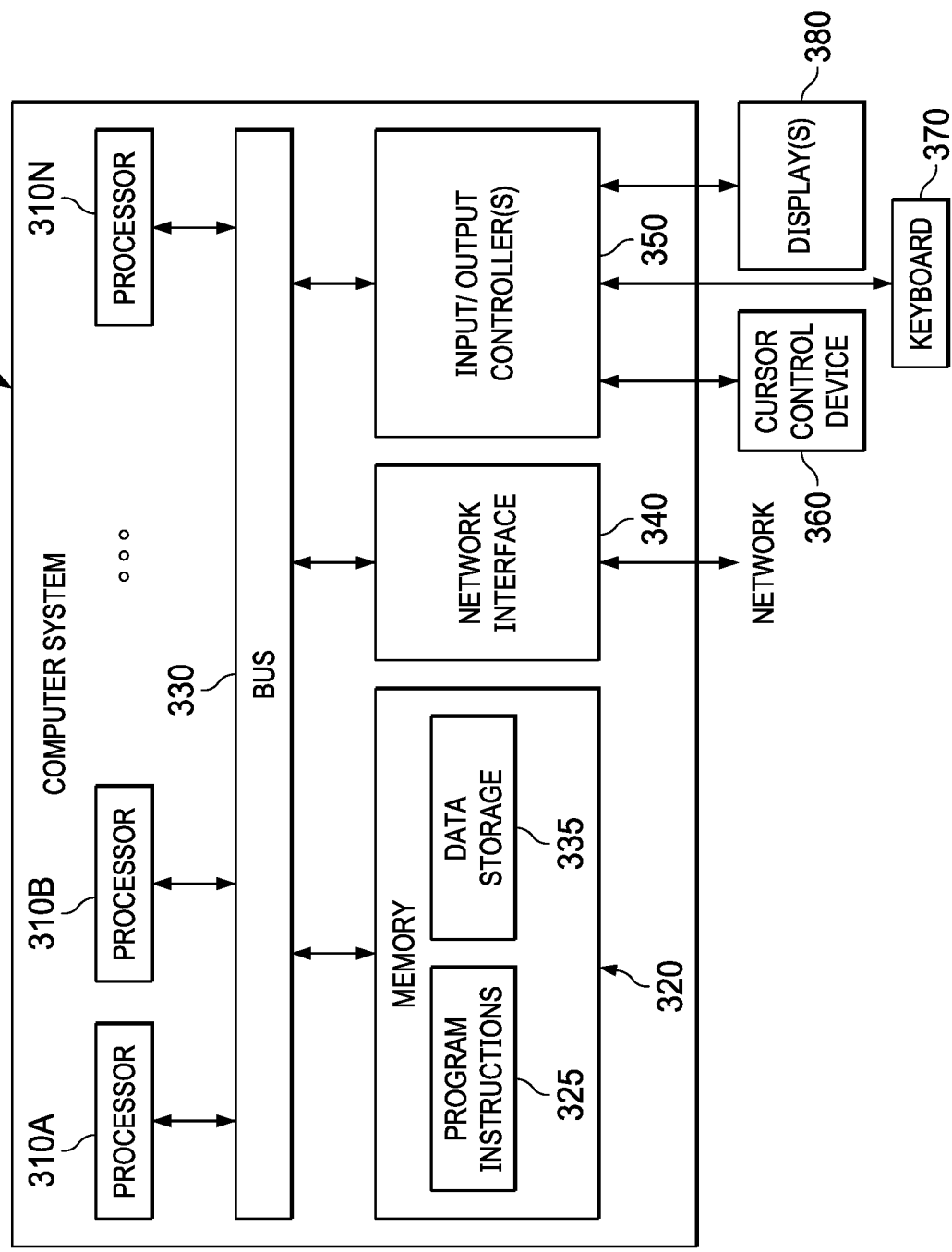

Having thus described the invention in general terms, reference will now be made to the accompanying drawings, which are not necessarily drawn to scale, and wherein:

FIG. 1 is a diagrammatic illustration of an example communications environment, wherein an example embodiment of the present systems and methods for investigative linkage of controlled-environment facility residents and associated non-resident telephone numbers to e-commerce application program (app) purchases may be deployed, according to some embodiments;

FIG. 2 is a flowchart of an example process for investigative linkage of controlled-environment facility residents and associated non-resident telephone numbers to e-commerce app purchases, in accordance with some implementations; and FIG. 3 is a block diagram of a computer system, device, station, or terminal configured to implement various techniques disclosed herein, according to some embodiments.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

For example, various types of controlled-environment facilities are present in today's society, and persons may be voluntary or involuntary residents of such facilities, whether temporarily or permanently. Examples of controlled-environment facilities may include correctional institutions (e.g., municipal jails, county jails, state prisons, federal prisons, military stockades, juvenile facilities, detention camps, home incarceration environments, etc.), healthcare facilities (e.g., hospitals, nursing homes, mental health facilities, rehabilitation facilities, such as drug and alcohol rehabilitation facilities, etc.), restricted living quarters (e.g., hotels, resorts, camps, dormitories, barracks, etc.), and the like. For convenience of explanation, various examples discussed herein are presented in the context of correctional facilities, or the like. For instance, in some of the embodiments discussed below, a controlled-environment facility may be referred to as a correctional facility, jail or prison, and its residents may be referred to as inmates, arrestees, or detainees. It should be understood, however, that the systems and methods described herein may be similarly applicable to other types of controlled-environment facilities and their respective residents (e.g., a hospital and its patients, a school dormitory and its students, etc.).

To wit, embodiments of the present systems and methods relate generally to communications with residents of controlled-environment facilities, specifically to linkage of e-commerce purchases associated with non-resident telephone numbers used in such communications. In particular, embodiments of the present systems and methods relate to investigative linkage of controlled-environment facility residents and associated non-resident telephone number to e-commerce application program (app) purchases, such as may be made by a (centralized) (multiple controlled-environment facility) investigative data aggregation and analysis system or platform. In accordance with embodiments of the present systems and methods, controlled-environment facility residents and associated non-resident telephone numbers are linked e-commerce app purchases. (A) non-resident telephone number(s) associated with (an) electronic communication(s) with a controlled-environment facility resident and/or (a) telephone number(s) associated with a non-resident communicating with a controlled-environment facility resident are captured. E-commerce app accounts associated with the captured telephone number(s) are determined, e-commerce app account(s) associated with the captured telephone number(s) is (are) accessed and information about purchases made by a non-resident associated with the accessed e-commerce app account(s), through the accessed app account(s) is gathered. A determination is then made whether information about (a) purchase(s) made through the accessed e-commerce app account(s) correlate with the resident, and an investigative lead resulting from information about the purchase(s) made through the at least one accessed e-commerce app account correlating with the resident is provided.

Retailer e-commerce (i.e. commercial transactions conducted electronically on the Internet) apps have emerged as a primary form for not only carrying out e-commerce, but making purchases in general. Such e-commerce apps may track (e.g. keep a record of) (all) purchases made by a particular customer via the app. Such apps are typically tied to one or more telephone numbers, for example, the mobile phone number of a smartphone on which the app is installed, and/or another phone number associated with the customer accessing the app.

Embodiments of the present systems and methods use a non-resident telephone number involved in a communication between a controlled-environment facility resident and a non-resident, such as, by way of example, the Dialed Telephone Number (DTN) that an inmate (resident) calls. The present systems and methods directly tie that number to any mobile phone app and allow investigators to retrieve the purchases made on the device. This investigation process, such as may be carried out by a (centralized multiple) investigative data aggregation and analysis system or platform allowing investigators to understand the purchasing habits of potential and or/current contacts of the inmates (controlled-environment facility residents) to assist in their investigation.

In an example scenario, inmate call records may show that an inmate made calls to their girlfriend before escaping. Investigators question the girlfriend, but she provides no help. However, investigators employ embodiments of the present systems and methods, using the DTN used by the inmate to call the girlfriend, to find that the girlfriend had purchased skiing equipment through an e-commerce app associate with the DTN and made a reservation through another (or the same) e-commerce app (such as a homestay app) for a house in a remote area in the Colorado mountains. Investigators find the escaped convict and the girlfriend at the house using the data obtained through the invention.

A "(multiple) controlled-environment facility investigative data aggregation and analysis investigative tool" employed in conjunction with the present systems and methods is an investigative tool that aggregates and analyzes data from multiple sources, including, in accordance with embodiments of the present invention, multiple controlled-environment facilities. This multiple controlled-environment facility investigative data aggregation and analysis investigative tool may take the form of a web-based portal enabling individuals to store and transmit information. Such a system may include forensic tools that analyze communications into and out of controlled-environment facilities to assist law enforcement. Such a multiple controlled-environment facility investigative data aggregation and data analysis system, such as the THREADS® system implemented by SECUIRUS® Technologies, may provide law enforcement with actionable intelligence and focused leads using data collected from various resources, including, in accordance with embodiments of the present systems and methods, e-commerce apps.

By applying a controlled-environment facility resident dialed DTN through a (centralized multiple) investigative data aggregation and analysis system or platform with definable Billing Name and Address (BNA) information for one or more non-residents and access to e-commerce apps that use DTN the present systems and methods provide investigative linkage of controlled-environment facility residents and associated non-resident purchases.

FIG. 1 is a diagrammatic illustration of example communications environment 100, wherein an example embodiment of the present systems and methods for investigative linkage of controlled-environment facility residents and associated non-resident telephone number(s) to e-commerce app purchases may be employed, for example with respect to multiple controlled-environment facilities 110, 120, etc., and/or a single controlled-environment facility (130), in accordance with some embodiments. Therein, onsite communication processing system 121, 131, external centralized communication processing system 141, such as may be deployed in a controlled-environment facility communications provider data center (140), or the like may provide telephone services, videoconferencing, online chat, e-messaging, and other communication services to residents of respective controlled-environment facility 110, 120, 130, etc. As illustrated, in some cases, a communication processing system (121, 131) may be co-located with a controlled-environment facility (120, 130, respectively). Alternatively, as also illustrated, a communication processing system (141) may be centrally or remotely located, such as in controlled-environment facility communications provider data center 140 in whole (such as with respect to facility 110) or in part (such as with respect to facility 120). Controlled-environment facility communications provider data center 140, and hence external centralized communication processing system 141, may be connected to such facilities via a public network (e.g. the Internet) or a private network, or the like (e.g. via a secure tunneling protocol over the internet, using encapsulation) (150) and may provide communication services to such multiple controlled-environment facilities. Such controlled-environment facility communication processing systems, particularly when deployed in, or in conjunction with, a controlled-environment facility communications provider data center (140), and/or in conjunction with onsite Administration Management System (AMS) 122, 132 (or a Jail Management System (JMS) in correctional environment embodiments), and/or external centralized AMS 142, may be referred to as a "controlled-environment facility secure communication platform," or the like. More generally, however, it should be noted that communication systems 121, 131, 141, etc. may assume a variety of forms, comprising, including and/or embodying telephony switches, such as electronic switching systems, or the like, and/or may be configured to serve a variety of facilities and/or users, whether within, or outside of, the respective controlled-environment facility.

Onsite AMS 122, 132 (or a Jail Management System (JMS) in correctional environment embodiments), and/or external centralized AMS 142 may be employed in accordance with various embodiments of the present systems and methods. In other embodiments, where the (central) controlled-environment facility communication system (141) is located remotely with respect to the controlled-environment facility (110, 120, etc.), access to AMS (or JMS) 122, 132, etc. may (also) be obtained via a computer network such as, for example, network 150. In various embodiments, the lives of resident/inmates may be electronically managed from intake/booking through release. An AMS (or JMS) deployed in conjunction with one or more correctional facilities provides management of various aspects thereof, such as facility management (including tracking inmates from booking through release), staff management (including time and attendance management and personnel dispatching), call management (including placing and blocking calls, accounting for call charges, distance commerce, determining credit worthiness of individuals, establishing and maintaining accounts, and handling purchases of goods and services), and inmate/resident management (including managing inmate information and tracking inmate activity). In accordance with embodiments of the present systems and methods, controlled-environment facility AMS 122, 132, etc. (e.g. a JMS with respect to correctional facilities), associated with at least one controlled-environment facility 120, 130 may maintain information with respect to the residents of the respective controlled-environment facility. An external remote, central AMS (142) may maintain information with respect to residents of one or more controlled-environment facilities (e.g. 110, 120). In the context of a correctional facility, the respective JMS or AMS databases may include information such as balances for inmate trust and calling accounts; trial schedule; conviction data; criminal record; sentencing data, time served, time remaining to be served, and release date; cell and cellmate assignments; inmate restrictions and warnings; commissary order history; telephone call history; call recordings made by the facility, or in accordance with present systems and methods; known or suspected gang or criminal affiliations; known or suspected affiliates, accomplices, or gang members; and any other information that may be relevant or useful to correctional facility staff to house and maintain inmates.

In some implementations, wherein the controlled-environment facility communication system (121, 131) is located within the controlled-environment facility (120, 130), it may have direct access to a respective AMS (122, 132) for garnering information used in accordance with various embodiments of the present systems and methods. In addition to providing certain visitation and communication operations, communication processing systems 121, 131, 141, etc. and/or AMS (or JMS) 122, 132, 142, etc. may attempt to ensure that a resident's calls, video conferences, online chats, e-messaging, etc. are performed only with non-residents whose identities, devices, email addresses, phone numbers, etc. are listed in that resident's Personal Allowed Number (PAN) or Pre-Approved Contact (PAC) list. Each resident's PAN or PAC list may be stored, for example, in a database maintained by respective AMS (or JMS) 122, 132 or 142, or the like. In addition to PAN or PAC list(s), AMS (or JMS) 122, 132 or 142 (databases), or the like, may also store inmate or resident profile data (RPD), as well as visitation rules applicable to each inmate or resident, Communication Detail Records (CDRs), or similar records, for resident phone calls, video visitations, texts, online chats, e-messaging, or the like. As detailed below, non-resident telephone numbers maintained in such databases, such as part of the PAN and/or PAC lists may be used in accordance with embodiments of the present systems and methods to access e-commerce app accounts for investigative purposes.

Residents may use more-or-less conventional telephones 113, 123, 133, or the like to access certain communication services, under control of respective communication processing system 121, 131, 141, etc. In accordance with embodiments of the present systems and methods more-or-less conventional telephones 113, 123, 133 may be camera-enabled, or otherwise associated with controlled-environment facility cameras, or the like. Additionally, or alternatively, in some facilities a resident may use an intelligent controlled-environment facility media and/or communications terminal 114*a* through 114*n*, 124*a* through 124*n*, 134*a* through 134*n*, or the like, to place voice calls, as well as for video visitation, under control of respective communication processing system 131, 141, etc. Such an intelligent controlled-environment facility media and/or communications terminal may be referred to as an Intelligent Facility Device (IFD) (114, 124, 134), which may be a video phone particularly adapted for use in a controlled-environment facility, but which may be used to place voice calls, as well. Alternatively, or additionally, IFDs may take the form of, or be used as, a voice phone that may have a touchscreen interface. Generally speaking, IFDs may be disposed in a visitation room, in a pod, as part of a kiosk, etc. Additionally, or alternatively, in some facilities, residents may also use a personal computer wireless device, such as a tablet computing device 115, 125, 135, smartphone/media player 116, 126, 136, or the like, which may have been adapted and/or approved for use in a controlled-environment facility. Such a tablet computing device or smartphone/media player may be referred to as an intelligent controlled-environment facility resident media and/or communications device, Intelligent Resident Device (IRD), or the like, and in a correctional institution embodiment, as an intelligent inmate media and/or communications device Intelligent Inmate Device (IID), or the like. As will be appreciated, IRDs, IFDs, or other similar devices, as well as phones 113, 123, 133, etc. have communications capabilities, to enable a party to participate in telephone calls, video visitation sessions (video calls), or the like with other call parties, such as non-residents, under control of respective communication processing system 121, 131, 141, etc. IRDs 114*a* through 114*n*, 124*a* through 124*n*, 134*a* through 134*n*, IFDs 114, 124, 134, or other similar devices, may be referred to collectively or individually as "(a) controlled-environment facility communication and/or media device(s)," or the like.

For a resident to initiate an outgoing communication, the resident may initiate telephone services by lifting the receiver on telephone 113, 123, 133, etc. or IFD 114, 124, 134, etc. and/or otherwise initiating a call, such as by launching an app on IRD 115, 125, 135, 116, 126, 136, etc. At which time, the resident may be prompted to provide a PIN, other identifying information or biometrics. Interactive voice response (IVR) unit 127, 137 or 147, which may be integrated into communication processing system 121, 131 and/or 141, as illustrated, may generate and play a prompt or other messages to the resident. Under the control of communication processing system 121, 131 and/or 141, etc. the device may be capable of connecting with a non-resident's device (e.g. telephone 163, non-resident computer 164, non-resident tablet computing device 165, non-resident smartphone/media player 166, or the like) across public network 170, such as a publicly switched telephone network (PSTN), an Integrated Services Digital Network (ISDN), Voice-over-IP (VoIP) or packet data network, such as for example the Internet, etc. Network 170 may be the same, or a different network, as network 150. Telephony switches 128, 138, 148 etc. in respective communication processing system 121, 131, 141, etc. may be used to connect calls across a PSTN (i.e. network 170), such as calls from controlled-environment facility telephone 113, 123 or 133 and non-resident telephone 163, which, in accordance with embodiments of the present systems and methods, may also be camera-enabled. Telephony router 129, 139, 149, etc., media gateway functionality, or the like of respective communication system 121, 131, 141, etc. may be used to route data packets associated with a digital call connection, via an Integrated Services Digital Network (ISDN), the Internet, or the like (i.e. network 170). For example, a non-resident party may have a personal or laptop computer 164 with a webcam, or the like, or devices 165 or 166 may have an integrated camera and display (e.g., a smart phone, tablet, etc.). A network connection between the parties may be established and supported by an organization or commercial service that provides computer services and software for use in telecommunications and/or VoIP, such as SKYPE®. Additionally, or alternatively, the correctional facility and/or the destination may use videoconferencing equipment compatible with ITU H.323, H.320, H.264, and/or V.80, or other suitable standards. In accordance with various embodiments of the present systems and methods, non-resident's devices, telephone 163, non-resident computer 164, non-resident tablet computing device 165, non-resident smartphone/media player 166, and/or the like, may be disposed in the non-resident's home, place of work, on their person, or the like. Additionally, or alternatively the non-resident devices may be disposed in a visitation area of controlled-environment facility 110, 120, 130, etc., which may be within, adjacent to, or remote with respect to controlled-environment facility 110, 120, 130, etc., itself.

In accordance with various embodiments of the present systems and methods, a controlled-environment communication apparatus that may carry out capture of non-resident phone numbers may take the form of central and/or onsite controlled-environment facility communication management system 140, and/or 121 or 131, respectively. Additionally, or alternatively, intelligent controlled-environment facility communication devices, such as IFDs 114, 124, 134, etc. and/or residents IIDs 115, 125, 135, 116, 126, 136, etc. may be employed to facilitate implementation of embodiments of the present systems and methods, and/or to carry out certain aspects of embodiments of the present systems and methods, such as capture of non-resident phone numbers.

Centralized investigative data aggregation and analysis system 190 may be a platform for providing investigative tools. Such investigative tools may provide collection, processing, analysis, and/or reporting of information for intelligence purposes. In some embodiments, the investigative tools may provide functions such as entity linkage analysis, communication statistics, organization analysis, communication behavior analysis, subscription usage analysis, common communication analysis, timelines, correlations, mapping, word search, language translation (whether machine translation or access to translation services), call recording (whether terminated external to the controlled-environment facility or internally thereto), call notification, call monitoring (whether real-time or recorded, and whether monitoring a particular call or a plurality of calls), call "barging," call control, visitation monitoring/background checking, crime tip conduit, account activity monitoring (whether tracing deposits and expenditures of monies or monitoring account trends and behavior, such as velocity of transactions), multiple database querying, and resource integration, and/or the like. One or more of these investigative tools may be provided through an intuitive user interface to provide ease of use, facilitate operation across a variety of user terminals, and/or to facilitate remote access to one or more features thereof. For example, in some cases, a web-based portal enabling individuals to store and transmit information, including forensic tools that analyze communications into and out of controlled-environment facilities to assist law enforcement may be provided. Such a web page portal may have menus comprising an investigator dashboard, to present and facilitate execution of various investigative operations. These investigative tools may log calls (e.g., as CDRs), so that an investigator may research them through an archive and may be provided access to internal and/or external criminal databases and/or other sources of useful information.

Computer-based environment components may include programing and/or hardware to implement embodiments of the present systems and methods. This programming may take the form of stored program instructions, programed firmware, or the like, while hardware might take the form of an Application Specific Integrated Circuit (ASIC), or the like, to carry out such aspects of embodiments of the present systems and methods.

Embodiments of the present systems and methods may be employed in the above-described environment, such as in a manner described below, with respect to FIG. 2, a flowchart of example implementation 200 investigative linkage of controlled-environment facility residents and associated non-resident telephone number to e-commerce app purchases. Therein, at 202, a controlled-environment facility secure communication platform (controlled-environment facility communication processing system 121, 131 and/or 141, and in some embodiments, controlled-environment facility AMS 122, 132 and/or 142), or the like, obtains a waiver to access any e-commerce app accounts associated with a non-resident and/or any telephone numbers associated with the non-resident, prior to allowing any communications between the non-resident and the controlled-environment facility resident. Such a waiver may be part of an end user agreement associated with use of controlled-environment facility communication services, including, such as by way of example, a controlled-environment facility communications app. Hence, the waiver may, in accordance with embodiments of the present systems and methods, allow the resident's controlled-environment facility, a controlled-environment facility communication vendor, law enforcement, and/or the like, to use a telephone number associated with a controlled-environment facility communication vendor app activated on the non-resident's mobile device, computer, etc. to make such access. Further, in accordance with some embodiments of the present systems and methods, the waiver may allow the resident's controlled-environment facility, a controlled-environment facility communication vendor, law enforcement, and/or the like, to garner passwords from the non-resident's mobile device, computer, etc. to use for such access.

The controlled-environment facility secure communication platform, or the like, captures at least one non-resident telephone number associated with one or more electronic communications with a controlled-environment facility resident and/or at least one non-resident telephone number associated with a non-resident communicating with the controlled-environment facility resident, at 204. Captured non-resident telephone numbers may be (a) telephone number(s) dialed, or otherwise called, by the resident, (a) telephone number(s) the non-resident used to call the resident, or the like. Alternatively, or additionally, telephone number(s) associated with the non-resident may be (a) telephone number(s) listed as associated with the non-resident in a database associated with the controlled-environment facility secure communication platform, such as on a PAC and/or PAN list for the resident.

At 206, a (centralized) investigative data aggregation and analysis system (190), or the like, receives, such as from the controlled-environment facility secure communication platform, the captured non-resident telephone number(s) associated with electronic communication(s) with the controlled-environment facility resident, and/or associated with the non-resident communicating with the resident, as well as identification of the resident.

The investigative data aggregation and analysis system (190), or the like, determines, at 208, if any e-commerce app accounts are associated with each of the captured telephone numbers. The investigative data aggregation and analysis system (190), or the like, accesses identified e-commerce app accounts associated with each captured telephone number at 210, and at 212, gathers, via the app, information maintained by associated e-commerce retailer about any purchases made, by the non-resident associated with the e-commerce app account(s). Such access may be garnered using passwords obtained from the non-resident's mobile device, computer, etc., consistent with the aforementioned waiver. Further, the investigative data aggregation and analysis system may gather (further) information about purchases made through the accessed e-commerce app accounts by monitoring purchases made through accessed, or other, e-commerce app accounts.

At 214, The investigative data aggregation and analysis system (190), or the like, determines whether information about the purchases made through the accessed e-commerce app accounts correlate with the resident, such as whether the purchases made through the accessed e-commerce app accounts are associated with, related to, connected to, linked with the resident or any activity the resident has participated in.

If the investigative data aggregation and analysis system (190), or the like, determines at 214 that the information about the purchases made through the accessed e-commerce app accounts correlates with the resident, then at 216, the investigative data aggregation and analysis system, or the like, provides an investigative lead, such as via a web-based interface provided by the investigative data aggregation and analysis system, or the like.

Further, embodiments of the present systems and methods may monitor subsequent purchases made through at least one of the accessed e-commerce app accounts. For example, the investigative data aggregation and analysis system (190), or the like, may receive information about subsequent electronic communication(s) between the resident and the non-resident, from the controlled-environment facility secure communication platform, or the like, similar to 206. Similar to 208, the investigative data aggregation and analysis system, or the like, may then determine any further e-commerce app accounts associated with a same or any different non-resident telephone numbers. The investigative data aggregation and analysis system, or the like, may then access any e-commerce app accounts associated with the same or any different non-resident telephone numbers, similar to 210, and similar to 212, gather information about any further purchases made, by a non-resident associated with the accessed e-commerce app account(s). Similar to 214, the investigative data aggregation and analysis system, or the like, may then determine whether information about the further purchases made through the further accessed e-commerce app accounts further correlate with the resident. Upon the investigative data aggregation and analysis system, or the like, determining that the further information about the further purchases made through the further accessed e-commerce app accounts correlates with the resident, the investigative data aggregation and analysis system, or the like, may supplement the investigative lead provided at 214, with information about the further purchases made through the further accessed e-commerce app accounts, such as via the web-based interface.

As noted, non-resident telephone numbers maintained in PAN and/or PAC lists may be used in accordance with embodiments of the present systems and methods to access e-commerce app accounts for investigative purposes. For example, embodiments of the present systems and methods may (such as at 202) search PAN and/or PAC lists, identify a (best) friend of resident that has had contact multiple times with the resident, check spending habits of the best friend (at 208 through 212) and make determinations and provide leads, accordingly (at 214 and 216, respectively). For example, the present systems and methods may identify that the best friend purchased ammunition and camping supplies, and also reserved a campsite in adjoining state, using e-commerce apps, providing a lead of an anticipated escape, or where the resident may be if he has already escaped.

Embodiments of the present systems and methods for investigative linkage of controlled-environment facility residents and associated non-resident telephone number to e-commerce appl purchases, as described herein, may be implemented at least in part as, or executed, at least in part, by one or more computer systems. One such computer system is illustrated in FIG. 3. In various embodiments, computer system 300 may be a server, a mainframe computer system, a workstation, a network computer, a desktop computer, a laptop, a tablet computing device, media player, or the like. For example, in some cases, computer 300 may implement one or more steps of example process 200 described above with respect to FIG. 2, and/or a computer system such as computer system 300 may be used as, or as part of, one or more of: AMSs 122, 132 and/or 142; controlled environment facility communications management systems 121, 131 and/or 141; centralized investigative data aggregation and analysis system 190; controlled-environment facility resident communications devices 113 through 116, 123 through 126, and 133 through 136; non-resident communications devices 163 through 166; and/or the like. In various embodiments two or more of these computer systems may be configured to communicate with each other in any suitable way, such as, for example, via public network 170, which may be the Internet, or the like, as discussed above, via a local area network using wired or wireless functionality.

As illustrated, computer system 300 includes one or more processors 310A-N coupled to a system memory 320 via bus 330. Computer system 300 further includes a network interface 340 coupled to bus 330, and one or more I/O controllers 350, which in turn are coupled to peripheral devices such as cursor control device 360, keyboard 370, display(s) 380, etc. Each of I/O devices 360, 370, 380 may be capable of communicating with I/O controllers 350, for example, via a wired connection (e.g., serial port, Universal Serial Bus port) or wireless connection (e.g., Wi-Fi, Bluetooth, Near Field Communications Link, etc.). Other devices may include, for example, microphones, antennas/wireless transducers, phone detection modules, etc.

In various embodiments, computer system 300 may be a single-processor system including one processor 310A, or a multi-processor system including two or more processors 310A-N (e.g., two, four, eight, or another suitable number). Processors 310 may be any processor capable of executing program instructions. For example, in various embodiments, processors 310 may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processors 310 may commonly, but not necessarily, implement the same ISA. Also, in some embodiments, at least one processor 310 may be a graphics processing unit (GPU) or another dedicated graphics-rendering device.

System memory 320 may be configured to store program instructions and/or data accessible by processor 310. In various embodiments, system memory 320 may be implemented using any suitable memory technology, such as static random-access memory (SRAM), synchronous dynamic RAM (SDRAM), nonvolatile/Flash-type memory, or any other type of memory. As illustrated, program instructions and data implementing certain operations and modules such as those described herein may be stored within system memory 320 as program instructions 325 and data storage 335, respectively. In other embodiments, program instructions and/or data may be received, sent, or stored upon different types of computer-accessible media or on similar media separate from system memory 320 or computer system 300.

A computer-accessible medium may include any tangible and/or non-transitory storage media or memory media such as electronic, magnetic, or optical media—e.g., disk or CD/DVD-ROM coupled to computer system 300 via bus 330. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

In an embodiment, bus 330 may be configured to coordinate I/O traffic between processor 310, system memory 320, and any peripheral devices in the computer system, including network interface 340 or other peripheral interfaces, such as I/O devices 360, 370, 380. In some embodiments, bus 330 may perform any necessary protocol, timing, or other data transformations to convert data signals from one component (e.g., system memory 320) into a format suitable for use by another component (e.g., processor 310). In some embodiments, bus 330 may include support for devices attached through various types of peripheral buses, such as a variant of the Peripheral Component Interconnect (PCI) bus standard or the Universal Serial Bus (USB) standard, for example. In some embodiments, the function of bus 330 may be split into two or more separate components, such as a northbridge chipset and a southbridge chipset, for example. In addition, in some embodiments some or all the functionality of bus 330, such as an interface to system memory 320, may be incorporated directly into processor(s) 310A-N.

Network interface 340 may be configured to allow data to be exchanged between computer system 300 and other devices attached to a network, such as other computer systems, or between nodes of computer system 300. In various embodiments, network interface 340 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

I/O controllers 350 may, in some embodiments, enable communications with one or more display terminals, keyboards, keypads, touchpads, scanning devices, voice or optical recognition devices, mobile devices, or any other devices suitable for entering or retrieving data by one or more computer system 300. Multiple I/O controllers 350 may be present in computer system 300 or may be distributed on various nodes of computer system 300. In some embodiments, I/O devices may be separate from computer system 300 and may interact with one or more nodes of computer system 300 through a wired or wireless connection, such as over network interface 340.

As shown in FIG. 3, system memory 320 may include program instructions 325, configured to implement certain embodiments described herein, and data storage 335, comprising various data may be accessible by program instructions 325. In an embodiment, program instructions 325 may include software elements, which may be configured to affect the operations discussed in FIGS. 1 through 3. Program instructions 325 may be implemented in various embodiments using any desired programming language, scripting language, or combination of programming languages and/or scripting languages (e.g., C, C++, C #, JAVA®, JAVASCRIPT®, PERL®, etc.). Data storage 335 may include data that may be used in these embodiments (e.g., recorded communications, profiles for different modes of operations, etc.). In other embodiments, other or different software elements and data may be included.

A person of ordinary skill in the art will appreciate that computer system 300 is merely illustrative and is not intended to limit the scope of the disclosure described herein. The computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

The various operations described herein, particularly in connection with FIGS. 1 through 3, may be implemented in software executed by processing circuitry, hardware, or a combination thereof. The order in which each operation of a given method is performed may be changed, and various operations may be added, reordered, combined, omitted, modified, etc. It is intended that embodiment(s) described herein embrace all such modifications and changes and, accordingly, the above description should be regarded in an illustrative rather than a restrictive sense.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An investigative system for linking controlled-environment facility residents and associated non-resident telephone numbers to e-commerce application program purchases, the system comprising:
    a controlled-environment facility secure communication platform comprising at least one processor and a memory coupled to the at least one processor and storing program instructions thereupon, which when executed by the at least one processor, cause the controlled-environment facility secure communication platform to:
        capture at least one non-resident telephone number associated with one or more electronic communications with a controlled-environment facility resident; and
    an investigative data aggregation and analysis system comprising at least one processor and a memory coupled to the at least one processor and storing program instructions thereupon, which when executed by the at least one processor, cause the investigative data aggregation and analysis system to:
        receive, from the controlled-environment facility secure communication platform, the captured at least one telephone number associated with one or more electronic communications with the controlled-environment facility resident and identification of the controlled-environment facility resident;
        determine e-commerce application program accounts associated with at least one captured telephone number;
        access at least one e-commerce application program account associated with the at least one captured telephone number;
        gather information about one or more purchases made, by a non-resident associated with the at least one accessed e-commerce application program account, through the accessed at least one e-commerce application program account;
        determine whether information about the one or more purchases made through the accessed at least one e-commerce application program account correlate with the resident; and
        provide an investigative lead resulting from information about the one or more purchases made through the at least one accessed e-commerce application program account correlating with the resident.

2. The investigative system of claim 1, wherein the controlled-environment facility secure communication platform program instructions further cause the controlled-environment facility secure communication platform to, prior to any communications with a controlled-environment facility resident, obtain a waiver to access an e-commerce application program account associated with the non-resident and/or a telephone number associated with the non-resident.

3. The investigative system of claim 1, wherein the investigative data aggregation and analysis system program instructions further cause the investigative data aggregation and analysis system to provide the investigative lead to the users via a web-based interface provided by the investigative data aggregation and analysis system.

4. The investigative system of claim 1, wherein a non-resident telephone number associated with one or more electronic communications is a telephone number called by the resident.

5. The investigative system of claim 1, wherein a non-resident telephone number associated with one or more electronic communications is a telephone number the non-resident used to call the resident.

6. The investigative system of claim 1, wherein gathering information about purchases made through the accessed e-commerce application program accounts includes monitoring purchases made through the at least one accessed e-commerce application program account.

7. The investigative system of claim 1, wherein the investigative data aggregation and analysis system program instructions further cause the investigative data aggregation and analysis system to monitor subsequent purchases made through at least one accessed e-commerce application program account.

8. The investigative system of claim 1, wherein the investigative data aggregation and analysis system program instructions further cause the investigative data aggregation and analysis system to:
    receive, from the controlled-environment facility secure communication platform, information about at least one subsequent electronic communication between the resident and non-resident;
    determine if at least one further e-commerce application program account is associated with a same or a different non-resident telephone number associated with the at least one subsequent electronic communication;
    access at least one e-commerce application program account associated with the same or the different non-resident telephone number;
    gather information about at least one further purchase made, by a non-resident associated with the least one accessed e-commerce application program account, through the least one accessed e-commerce application program account;
    determine whether information about the least one further purchase made through the further accessed least one e-commerce application program account further correlates with the resident; and supplement the investigative lead with information about the least one further purchase made through the least one further accessed e-commerce application program account in response to a determination that the information about the least one further purchase further correlates with the resident.

9. A method for linking controlled-environment facility residents and associated non-resident telephone numbers to e-commerce application program purchases, the method comprising:
- capturing, by a controlled-environment facility secure communication platform associated with at least one controlled-environment facility, at least one telephone number associated with a non-resident communicating with a controlled-environment facility resident;
- receiving, at an investigative data aggregation and analysis system, from the controlled-environment facility secure communication platform, the at least one captured telephone number associated with the non-resident communicating with the controlled-environment facility resident;
- determining, by the investigative data aggregation and analysis system, at least one e-commerce application program account associated with a captured telephone number;
- accessing, by the investigative data aggregation and analysis system, at least one e-commerce application program account associated with the captured telephone number;
- gathering, by the investigative data aggregation and analysis system, information about one or more purchases made through the at least one accessed e-commerce application program account by a non-resident associated with the at least one accessed e-commerce application program;
- determining, by the investigative data aggregation and analysis system, whether information about the one or more purchases made through the at least one accessed e-commerce application program accounts correlate with the resident; and
- providing, by the investigative data aggregation and analysis system, an investigative lead resulting from a determination information about the one or more purchases made through the at least one accessed e-commerce application program account correlates with the resident.

10. The method of claim 9, further comprising, prior to any electronic communication with the resident, obtaining a waiver to access an e-commerce application program account associated with the non-resident and/or any telephone numbers associated with the non-resident.

11. The method of claim 9, further comprising providing the investigative leads to the users via a web-based interface provided by the investigative data aggregation and analysis system.

12. The method of claim 9, wherein the at least one telephone number associated with the non-resident is a telephone number called by the resident.

13. The method of claim 9 wherein at least one telephone number associated with the non-resident is a telephone number the non-resident used to call the resident.

14. The method of claim 9, wherein the at least one telephone number associated with the non-resident is a telephone number listed as associated with the non-resident in a database associated with the controlled-environment facility secure communication platform.

15. The method of claim 9, wherein the at least one telephone number associated with the non-resident listed as associated with the non-resident is on a pre-approved contact and/or personal allowed number list for the resident maintained in the database associated with the controlled-environment facility secure communication platform.

16. The method of claim 9, wherein gathering information about the one or more purchases made through the accessed e-commerce application program accounts include monitoring purchases made through at least one of the accessed e-commerce application program accounts.

17. The method of claim 9, further comprising monitoring subsequent purchases made through at least one of the accessed e-commerce application program accounts.

18. The method of claim 9 further comprising: receiving, from the controlled-environment facility secure communication platform, information about at least one subsequent electronic communication between the resident and non-resident; determining a further e-commerce application program account associated with a same or any different telephone number associated with the non-resident; accessing an e-commerce application program account associated with the same or a different telephone number associated with the non-resident; gathering information about a further purchase made through accessed e-commerce application program accounts; determining whether information about the further purchases made through the further accessed e-commerce application program accounts further correlate with the resident; and supplementing the investigative lead with information about the further purchases made through the further accessed e-commerce application program accounts, in response to the determining the information about the further purchases further correlate with the resident.

19. A tangible non-transitory computer-readable storage medium having program instructions stored thereon that, upon execution by a controlled-environment facility investigative data aggregation and analysis system, cause the investigative data aggregation and analysis system to:
- receive at least one non-resident telephone number associated with one or more electronic communications with a controlled-environment facility resident and/or at least one non-resident telephone number associated with a non-resident communicating with the controlled-environment facility resident;
- determine at least one e-commerce application program account associated with a received telephone number;
- access at least one e-commerce application program account associated with the received telephone number;
- gather information about one or more purchases made through the at least one accessed e-commerce application program account by a non-resident associated with the at least one accessed e-commerce application programs;
- determine whether information about the one or more purchases made through the at least one accessed e-commerce application program accounts correlate with the resident; and
- provide an investigative lead resulting from a determination information about the one or more purchases made through the at least one accessed e-commerce application program account correlates with the resident.

20. The tangible non-transitory computer-readable storage medium of claim 19, wherein execution of the program instructions further cause the investigative data aggregation and analysis system to:

receive information about at least one subsequent electronic communication between the resident and non-resident;

determine at least one further e-commerce application program account associated with a same or a different non-resident telephone number associated with the at least one subsequent electronic communication;

access an e-commerce application program account associated with the same or a different non-resident telephone number;

gather information about a further purchase made, by a non-resident associated with the accessed e-commerce application program, through accessed e-commerce application program accounts;

determine whether information about the further purchases made through the further accessed e-commerce application program accounts further correlate with the resident; and supplement the investigative lead with information about the further purchases made through the further accessed e-commerce application program accounts in response to a determination that the information about the further purchases further correlate with the resident.

* * * * *